(12) United States Patent
Gladwin et al.

(10) Patent No.: US 6,879,865 B1
(45) Date of Patent: Apr. 12, 2005

(54) STRUCTURE AND METHOD FOR SELECTING, CONTROLLING AND SENDING INTERNET-BASED OR LOCAL DIGITAL AUDIO TO AN AM/FM RADIO OR ANALOG AMPLIFIER

(75) Inventors: Stephen Christopher Gladwin, Chicago, IL (US); Depeng Bi, Algonquin, IL (US); Jeffrey Jonathan Spurgat, Madison, WI (US); Michael Cortopassi, Arlington Heights, IL (US)

(73) Assignee: Mayland, LLC, Richmond, VA (US)

( * ) Notice: Subject to any disclaimer, the term of this patent is extended or adjusted under 35 U.S.C. 154(b) by 837 days.

(21) Appl. No.: 09/649,981

(22) Filed: Aug. 29, 2000

Related U.S. Application Data

(60) Provisional application No. 60/151,714, filed on Aug. 31, 1999.

(51) Int. Cl.[7] .............................................. G06E 17/00
(52) U.S. Cl. ...................... 700/94; 704/272; 369/29.02
(58) Field of Search ........................... 700/94; 704/272; 381/100, 124, 61; 369/29.02, 47.1; 368/39, 27

(56) References Cited

U.S. PATENT DOCUMENTS 6,084,638 A * 7/2000 Hare et al. ................. 348/552

* cited by examiner

Primary Examiner—Melur Ramakrishnaiah
(74) Attorney, Agent, or Firm—Katten Muchin Zavis Rosenman; John S. Paniaguas

(57) ABSTRACT

A system and method that allows a host PC to provide an analog audio signal for a radio or amplifier without interfering with the operation of the host PC. This invention also allows the audio signal to be selected and controlled by a remote device without interfering with the operation of the host PC.

8 Claims, 5 Drawing Sheets

STRUCTURE AND METHOD FOR SELECTING, CONTROLLING AND SENDING INTERNET-BASED OR LOCAL DIGITAL AUDIO TO AN AM/FM RADIO OR ANALOG AMPLIFIER

CROSS-REFERENCE TO RELATED APPLICATIONS

This application claims the benefit and priority of U.S. Provisional Application No. 60/151,714 filed on Aug. 31, 1999.

BACKGROUND OF THE INVENTION

1. Field of the Invention

The present invention relates to a structure and a method for selecting, controlling and sending Internet-based or digital audio to an AM/FM radio or amplifier.

2. Description of the Drawings

There is an ever-increasing amount of audio content available as digital computer files (such as in the MP3 format like those found at www.mp3.com) or as streaming digital audio (such as using the streaming digital audio techniques in U.S. Pat. No. 5,579,430). These new types of audio content can be played on a personal computer with a sound card, but cannot be played on a radio or stereo that is designed to receive and amplify analog audio signals. There are several techniques for converting a digital audio source to an analog signal that could be used by analog radio or amplifier, but these techniques interfere with the operation of the host PC and would require use of the PC to select and control the audio, for example, on an analog radio. Thus, there is a need to provide a system which enables Internet-based or digital audio to be played, for example, on an analog radio without tying up a personal computer.

SUMMARY OF THE INVENTION

Briefly, the present invention relates to a system and method that allows a host PC to provide an analog audio signal for a radio or amplifier without interfering with the operation of the host PC. This invention also allows the audio signal to be selected and controlled by a remote device without interfering with the operation of the host PC.

BRIEF DESCRIPTION OF THE DRAWINGS

These and other advantages of the present invention will be readily apparent from the following specification and attached drawing wherein.

DETAILED DESCRIPTION

Figure 1:
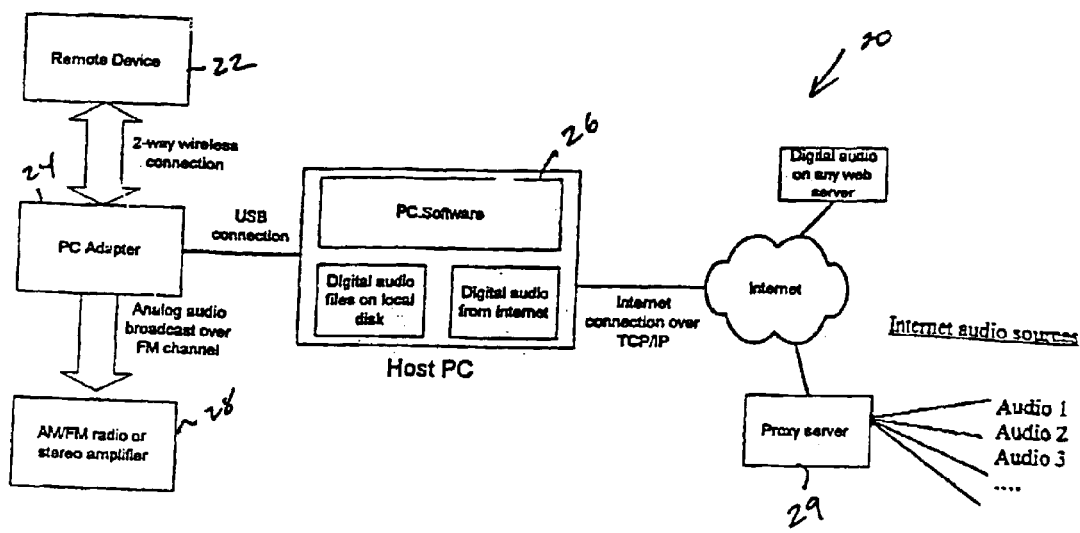
FIG. 1 is a block diagram of the system in accordance with the present invention, shown connected to a host personal computer, which, in turn, is connected to the Internet.

The present invention is adapted to interface with a host personal computer (PC) which, in turn, is adapted to be connected to the Internet in order to obtain audio sources from the Internet or other digital audio sources from any web server. The system generally identified with the reference numeral 20. The system 20 is illustrated in FIG. 1 and includes a remote device 22, a PC adapter 24 and a host PC 26. The system 20 is adapted to enable various digital audio sources, for example, from the Internet or other digital audio sources, such as digital audio sources on any web server, to be played on an AM/FM radio or stereo amplifier 28 without interfering with the operation of the host PC 10.

System Components

Remote Device

Figure 2:
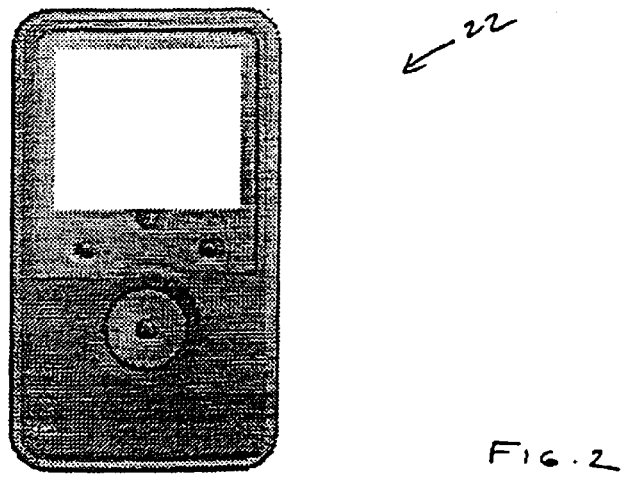
FIG. 2 is a front view of a remote device which forms a part of the present invention.
Figure 3:
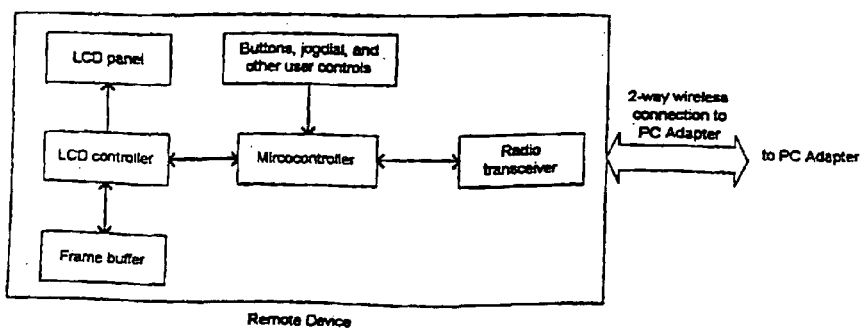
FIG. 3 is a block diagram of the remote device illustrated in FIG. 2.

The remote device 22 (FIG. 2) may have a 160×160 graphical display screen and control buttons. This display provides information about available audio content, information about how to select audio content, information about audio content that has been selected and other information. The control buttons are used to select and control audio content. As shown in FIG. 3, remote device 22 may connect to the PC adapter 24 over a radio link, for example, a 2-way wireless link.

The remote device 22 may have three buttons and one jogdial. Pressing the middle button brings back the previous screen. Pressing one of the other two buttons causes the content to be saved on host PC 26. Pressing the third button will initiate the purchase of the currently playing audio clip. The jogdial browses the list and pressing its middle button will selects and plays the clip.

PC Adapter

Figure 4:
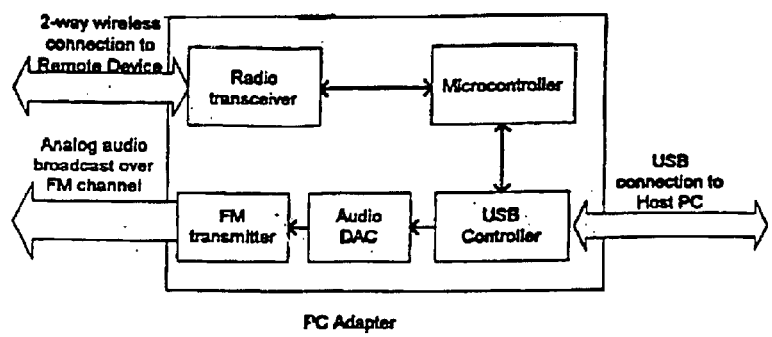
FIG. 4 is a block diagram of a PC adapter which forms a part of the present invention.
Figure 5:
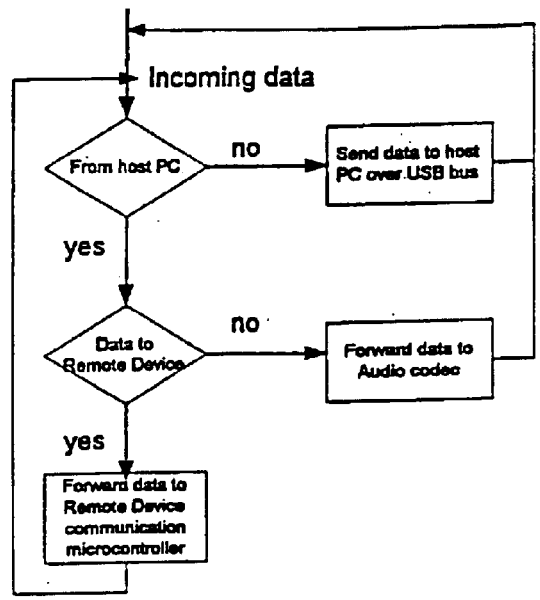
FIG. 5 is a flow chart of a universal serial bus (USB) connection between the host PC and the PC adapter in accordance with the present invention.

The PC adapter 24 connects the host PC 26 over a universal serial bus (USB) port and broadcasts analog radio data to the AM/FM radio and stereo amplifier 28. This analog audio data is converted from digital audio data and transmitted from the host PC over USB connection by the PC software as shown in FIG. 5. Also, it bridges 2-way data between remote device 22 and the host PC 26. A block diagram of the PC adapter 24 is illustrated in FIG. 4.

The microcontroller component encodes LCD display data and decodes button, dial and other remote control user inputs.

Proxy Server

The proxy server 29 serves as a digital audio portal site. The proxy server maintains a series of links to available digital audio sources on the Internet and formats information about these sites for display on the remote device 22.

PC Software

The PC software illustrated in FIG. 5 gets digital audio data from audio files on the local disk and/or internet streaming audio data. This data is organized as a play list. The play list is transferred to the remote device 22. The user selects and plays a clip by using the control buttons on the remote device 22. The remote device 22 then sends these commands to PC software which then plays this clip. The playing process is this: the PC software sends the address of the clip to the audio player. The audio player sends data to the USB audio driver which writes the audio data to USB.

The PC adapter 24 will electronically converts the digital data into analog data and broadcast the data over an unused FM channel. This channel is selectable.

Figure 6:
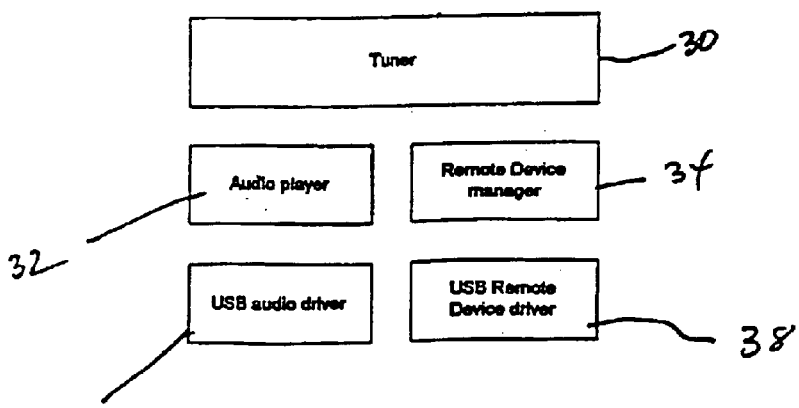
FIG. 6 is a block diagram of the PC software components in accordance with the present invention.

FIG. 6 is a block diagram of the PC software components on the host PC 26 and includes a tuner 30, an audio player 32, a remote device manager 34, universal serial bus (USB) audio driver 36 and a USB remote device driver 38. FIGS. 7–10 represent flow charts of the devices. A brief description of the software components is provided below.

Tuner

The tuner software allows the user to select internet radio stations, local digital audio files, and Internet streaming audio to create playlists.

Audio Player

Figure 7:
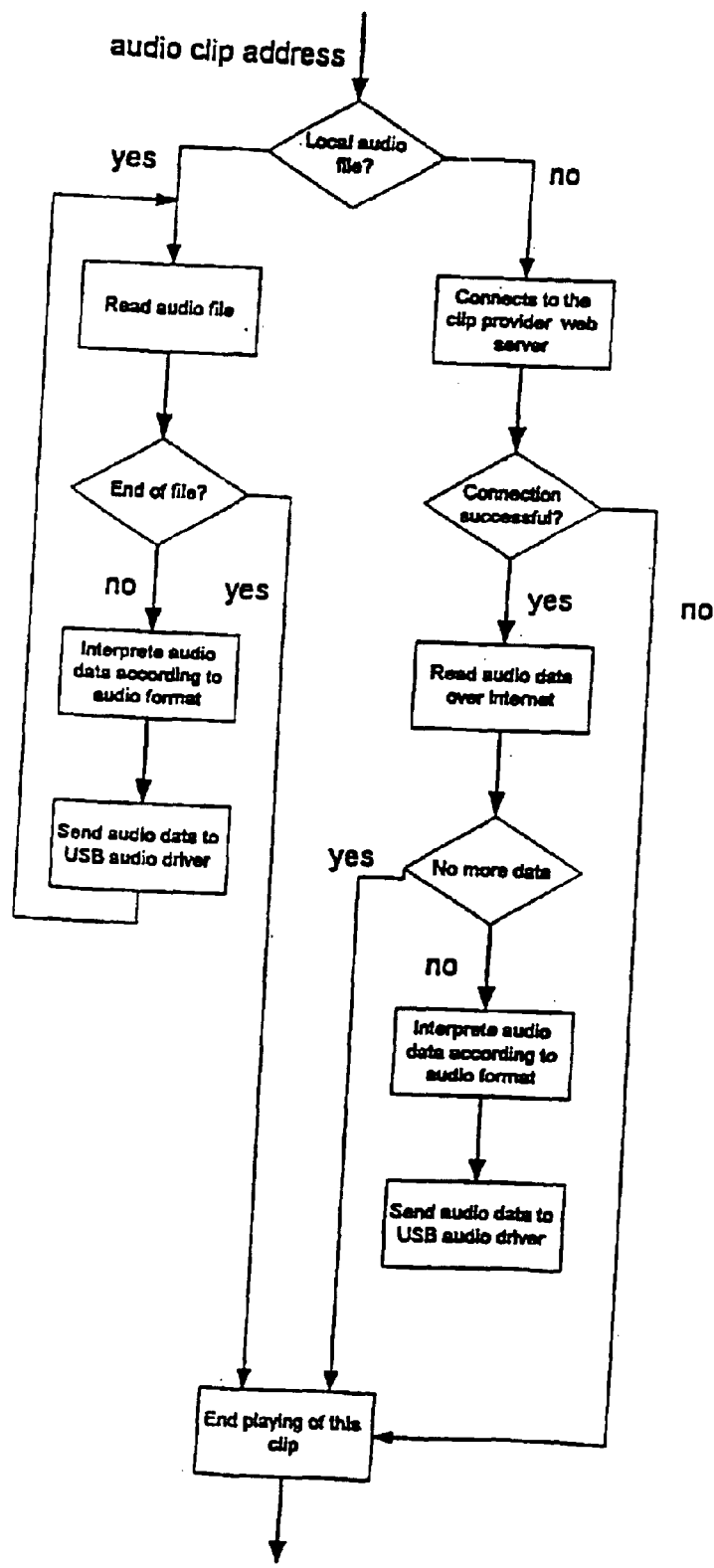
FIG. 7 is a flow chart of the audio player in accordance with the present invention.

The audio player software plays audio and runs in the background. It functions in a similar way as other popular audio players, like Reaknetwork=s G2 player and Microsoft=s Windows Media Player. FIG. 7 is a flowchart of the audio player.

USB Remote Device Driver

Figure 10:
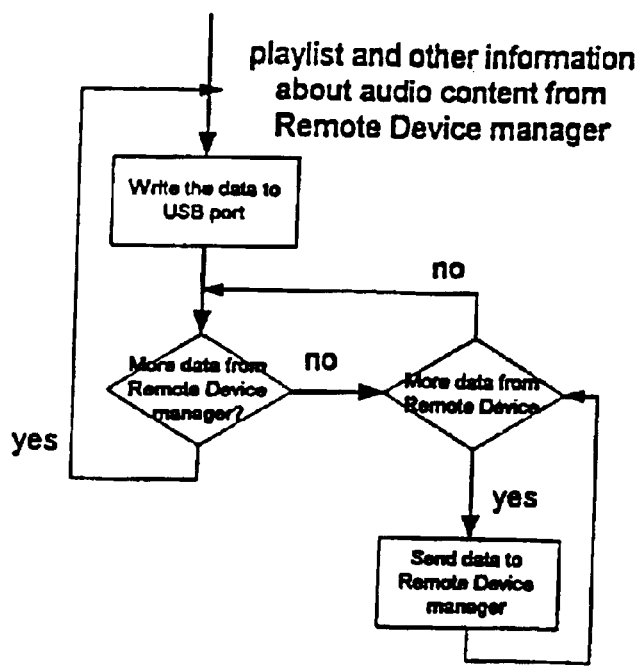
FIG. 10 is a flow chart of the USB remote device driver in accordance with the present invention.

This driver receives data from remote device manager and writes it to remote device 22 through a USB port. Also, it receives data from remote device 22 through the USB port and forwards it to remote device manager. FIG. 10 is a flow chart of the USB remote device driver.

Remote Device Manager

Figure 8:
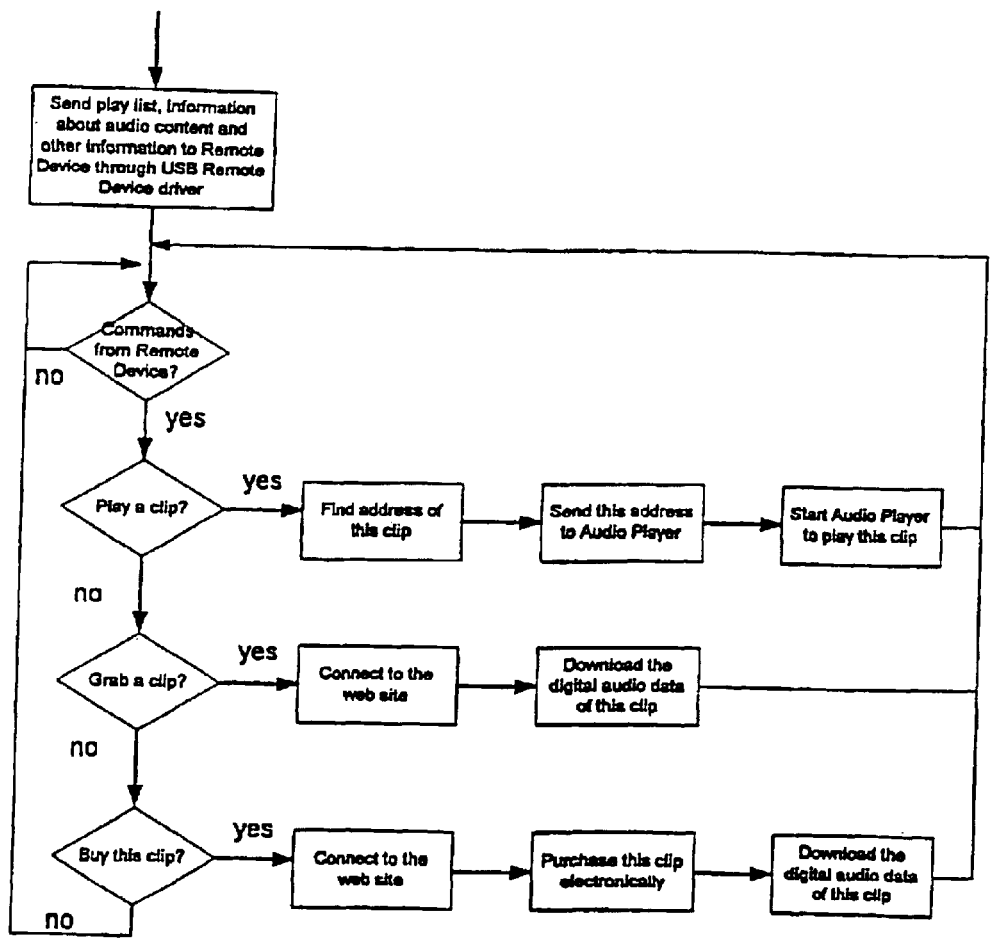
FIG. 8 is a flow chart of a remote device manager in accordance with the present invention.

This component sends playlist and other information to the remote device 22, and it processes the commands sent from remote device 22. FIG. 8 is a flow chart of the remote device driver.

USB Audio Driver

Figure 9:
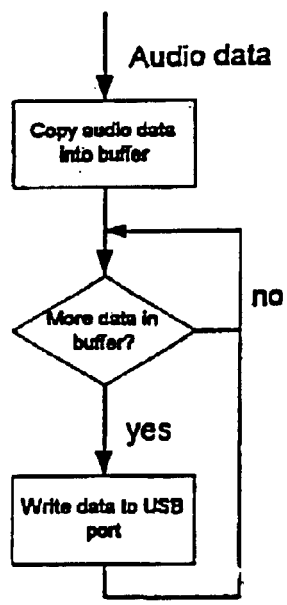
FIG. 9 is a flow chart of the USB audio driver in accordance with the present invention.

This driver receives audio data from audio player and sends it to PC adapter 26 through USB connection. FIG. 9 is a flow chart of the USB audio driver.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows.

1. A system for converting audio digital data to audio analog data, said system including a host personal computer (PC), configured to receive predetermined digital data, the system comprising:

a PC adapter in communication with said host PC, said PC adapter also configured to be connected to a remote analog device, and including means for receiving said digital audio data from said host PC and converting said digital audio data to analog audio data for playback by an analog device without interfering with the operation of the host PC and digital content data; said PC adapter including means for receiving signals from a remote device and controlling said host PC to play the digital audio content selected by the user on said remote device; and a remote device in communication with said PC adapter which includes means for receiving said digital content data from said PC adapter; a display for displaying said digital content data: and a user interface for enabling a user to select digital audio content displayed on the display and transmit signals representative of selected digital audio content to said PC adapter.

2. The system as recited in claim 1, wherein said analog device is located remotely from said PC adapter.

3. The system as recited in claim 2, wherein said analog device is coupled to said PC adapter by way of a radio link.

4. The system as recited in claim 1, wherein said remote device is operatively connected to said PC adapter by way of a radio link.

5. The system as recited in claim 1, wherein said digital data bus is a serial bus.

6. The system as recited in claim 5, wherein said serial bus is a universal serial bus (USB).

7. The system as recited in claim 1, wherein said analog device is a radio.

8. The system as recited in claim 1, wherein said analog device is an amplifier.

* * * * *